United States Patent
Neumann et al.

(10) Patent No.: US 7,108,737 B2
(45) Date of Patent: Sep. 19, 2006

(54) METHOD FOR THE PURIFICATION OF CORROSIVE GASES

(75) Inventors: Ewald Neumann, Riedstadt/Erfelden (DE); Wolfgang Himmler, Reilingen (DE); Werner Büttner, Darmstadt/Arheilgen (DE); Harald Fritsch, Groß-Gerau (DE); Hans-Jürgen Schmidt, Breuberg/Sandbach (DE); Martin Hostalek, Darmstadt/Arheilgen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 61 days.

(21) Appl. No.: 10/472,846

(22) PCT Filed: Mar. 4, 2002

(86) PCT No.: PCT/EP02/02295

§ 371 (c)(1),
(2), (4) Date: Sep. 26, 2003

(87) PCT Pub. No.: WO02/078820

PCT Pub. Date: Oct. 10, 2002

(65) Prior Publication Data
US 2004/0089152 A1 May 13, 2004

(30) Foreign Application Priority Data
Mar. 28, 2001 (DE) ................. 101 15 345

(51) Int. Cl.
*B01D 47/00* (2006.01)
*B01D 53/22* (2006.01)
(52) U.S. Cl. ............... 95/45; 95/47; 95/48; 95/214

(58) Field of Classification Search ............... 95/45, 95/47, 48, 149, 156, 214, 230, 237, 44, 46; 96/5, 6, 219, 240, 361, 364
See application file for complete search history.

(56) References Cited

U.S. PATENT DOCUMENTS 3,967,941 A * 7/1976 Terao .................. 96/318
4,772,295 A * 9/1988 Kato et al. ............ 95/50
4,781,910 A * 11/1988 Van Dijk ............. 423/221

(Continued)

FOREIGN PATENT DOCUMENTS

EP 1065168 A 1/2001

(Continued)

OTHER PUBLICATIONS

Internet Document "membrane, semipermeable," Hawley's Condensed Chemical Dictionary, 14th Edition, John Wiley & Sons, Inc, http://www.knovel.com, 2002.*

(Continued)

Primary Examiner—Frank M. Lawrence

(57) ABSTRACT

The present invention relates to a novel process for the preparation of high-purity chemicals with an extremely low particle count, such as ammonia gas, hydrogen fluoride and hydrogen chloride, which are also used as aqueous solutions in semiconductor technology the corrosive gas is enriched with an absorbent which is miscible with the gas and in which impurities present in the gas are soluble, and the gas is subsequently subjected to membrane filtration.

21 Claims, 1 Drawing Sheet

U.S. PATENT DOCUMENTS

| | | | |
|---|---|---|---|
| 4,936,880 A * | 6/1990 | Sundberg | 96/361 |
| 5,196,616 A | 3/1993 | Lee et al. | |
| 5,722,442 A * | 3/1998 | Hoffman et al. | 134/102.1 |
| 5,749,941 A | 5/1998 | Jansen et al. | |
| 5,753,009 A * | 5/1998 | Sirkar et al. | 95/45 |
| 5,876,486 A * | 3/1999 | Steinwandel et al. | 95/44 |
| 6,165,253 A * | 12/2000 | Sirkar et al. | 96/6 |
| 6,228,145 B1 * | 5/2001 | Falk-Pedersen et al. | 95/44 |
| 6,355,092 B1 * | 3/2002 | Jansen et al. | 95/45 |
| 2001/0051128 A1 * | 12/2001 | Hoffman et al. | 423/470 |

FOREIGN PATENT DOCUMENTS

| | | | |
|---|---|---|---|
| JP | 53-058975 A | * | 5/1978 |
| WO | WO 9639266 A | | 12/1996 |

OTHER PUBLICATIONS

Chemical Abstracts, vol. 122, No. 10, Mar. 6, 1995, Columbus Ohio, US; abstract No. 110018g, Mukherjee, D. et al.: "Ultrapurification and recycling of hydrofluoric acid etching solutions by reverse osmosis: membrane performance and multicomponent rejection" Seite 270.

* cited by examiner

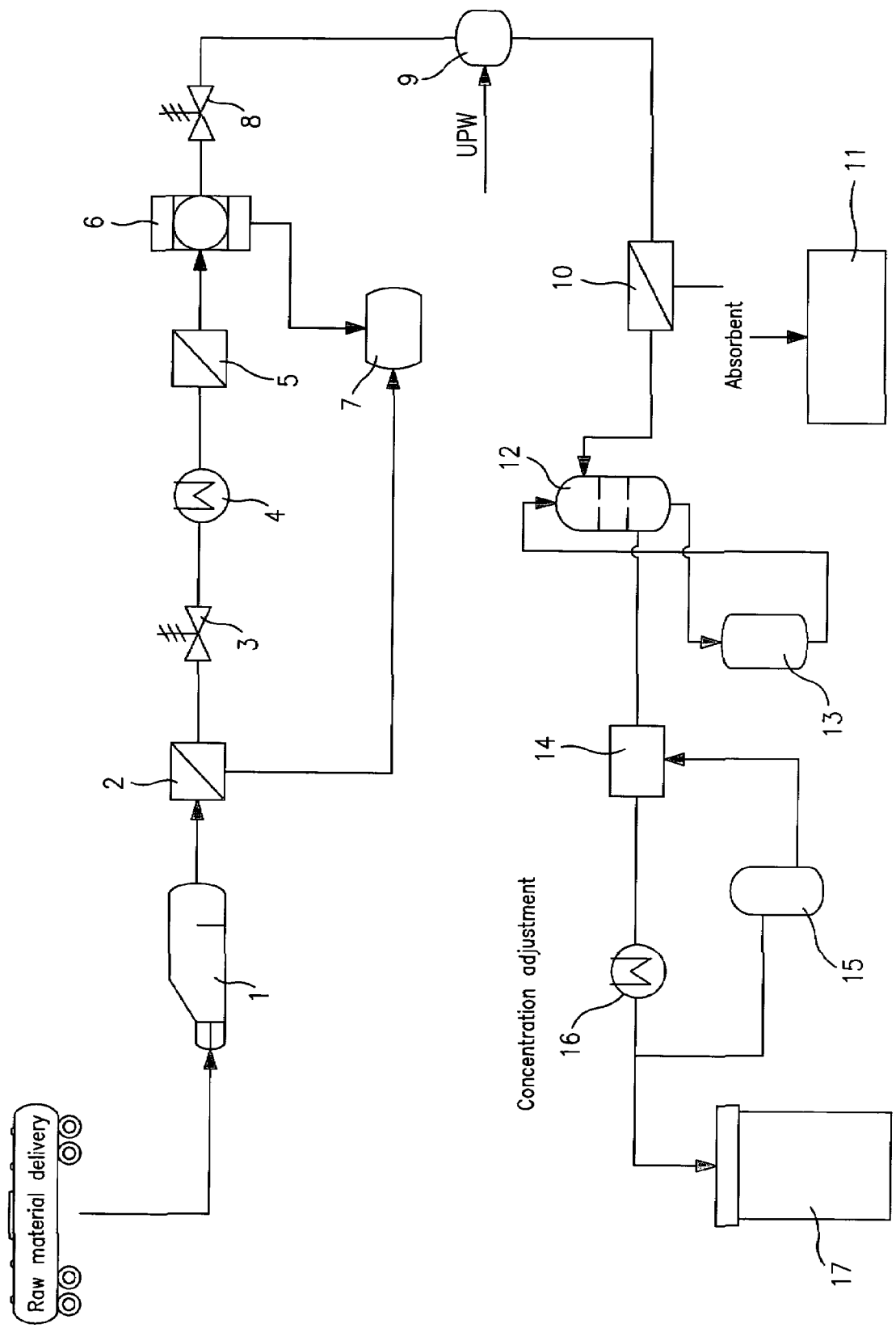

METHOD FOR THE PURIFICATION OF CORROSIVE GASES

The present invention relates to a novel process for the preparation of high-purity chemicals with an extremely low particle count, such as ammonia gas, hydrogen fluoride and hydrogen chloride, which are also used as aqueous solutions in semiconductor technology.

For the production of highly integrated electronic circuits (microchips), extremely high-purity gases and aqueous chemical solutions, inter alia, are required. Important solutions are: ammonia solution from ammonia gas, hydrofluoric acid solution from hydrogen fluoride and hydrochloric acid solution from hydrogen chloride.

Pure solutions are generally prepared by freeing technical-grade chemicals from particulate impurities by static filtration and producing a solution having a desired concentration by means of ultra-high-purity water. A purification process for hydrochloric acid using this method is described, for example, in U.S. Pat. No. 5,846,387.

Ultrafiltration is to date the only and most effective process by means of which extremely small particles can be removed from gases. However, according to data disclosed in the literature, ultrafiltration only removes particles of high-molecular-weight organic compounds, and consequently only particles having a size of >10 microns daltens can be removed in this way. By contrast, metal ions, but also salt-containing particles, have particle sizes of <1 to 5 microns. These particle sizes cannot be removed by ultrafiltration. It has hitherto only been possible to remove particles having diameters of less than 10 microns by hyperfiltration or by reverse osmosis. Reverse osmosis is unsuitable both for the purification of gases and of highly aggressive chemicals owing to the precautions necessary in the process. Experiments with various reverse osmosis plants have shown that if the pH deviates significantly from neutral, the membranes swell and become impermeable, i.e. become "blocked". In addition, the actual particle removal by reverse osmosis plants required solutions of different concentrations at the semi-permeable separating membranes.

The absorption columns usually employed are also unsuitable for purification of this type. On the one hand, there is a risk of gas breakthrough in the case of wall flow in the column. Another problem consists in inhomogeneous layering of the packing elements in the column, which are employed to increase the surface area of the interfacial layers. The actual design of the columns also represents a major problem since this is predominantly carried out intuitively. There is no arithmetical method for the design of corresponding columns which allows a prediction of the purification effect in the ppt range, especially as the aggressive gases to be purified interact both with the packing elements and also with the solvents employed and the material of the columns.

It is known that purified and pressure-liquefied gases can additionally be passed through evaporators, and the gas can subsequently be purified by absorption of metallic impurities via one or more scrubbers. The scrubbing liquid employed here is a solution of the same chemical which is saturated with ultra-high-purity water.

EP 856715 A2 describes a process for the removal of metallic impurities from corrosive gases by passing the latter into a receiver after generation of the gas phase. This process achieves both a reduction in the metal ion concentration and also in the particle count, since the transfer of the gas phase takes place automatically due to the pressure difference without mechanical pumping.

All known processes or process arrangements for the production of high-purity, low-particle solutions have very similar problems.

If the purified gas is fed directly into a receiver containing ultra-high-purity water, very high gas velocities arise at the inlet nozzle which cause abrasion in and at the nozzle and thus have the consequence of particulate and cationic re-contamination of the solution.

Since the dissolution of the purified gases in water is an exothermic reaction, precautions for good heat dissipation have to be taken.

Inadequate heat dissipation in the receiver is associated with considerable temperature variations and consequently also considerable pressure variations. This in turn results in concentration deviations in the solution. It is therefore generally attempted to homogenise the solution by introducing the gas directly into the solution and simultaneously pumping the solution through a bypass zone. However, this succeeds only incompletely since simple pumping is a static operation which causes layering of the solution in the storage tank. It does not cause completely homogeneous mixing of the solution.

In order to be able to employ chemicals such as ammonia, hydrofluoric acid and hydrochloric acid in the electronics industry and semiconductor production, grades with the lowest possible metal ion content must be available.

Corresponding impurities are often washed out of the gas by absorption with the aid of packed columns. Packing elements are employed in this operation in order to increase the exchange area between scrubbing liquid and gas and to extend the residence time of the gas in the column. There is a danger in packed columns of unpurified gas breaking through (wall flow of the gas), and of aerosols being transferred into the pure circuit owing to a limited efficiency of the demister installed at the top of the column. The degree of purification in columns, in particular in the case of mass transfer in the ppt range, can usually only be set intuitively by means of additions. The ideal state of individual stream threads of wherever possible the same length, equal flow rates and constant mixing ratios between liquid and gas is not achieved fully in any column. For optimisation, a plurality of columns are consequently often connected in series in order to be able to ensure constant purification in the high-purity range.

The known purification processes for the preparation of high-purity chemicals do not enable the removal of organic impurities, such as, for example, oils which are always present in pressure-liquefied technical-grade ammonia gases. Typical oil contents in technical-grade ammonia gas are between 10 and 50 ppm/w. Without removal of the oils, a significant reduction in organic impurities ("TOC", total organic carbon) in the purified solutions therefore does not occur.

The object of the present invention is thus to provide a means which can be employed in a simple manner or an inexpensive process which can be carried out in a simple manner for the purification of corrosive gases and for the preparation of purified solutions of these gases which can be carried out in a simple plant and gives products of constant, high-purity, low-particle quality and which does not have the disadvantages described above. A further object of the invention is to provide a corresponding process which can be used for the purification of pressure-liquefied gases, such as, for example, ammonia, hydrofluoric acid or hydrochloric acid.

The object is achieved by a continuous process for the removal of particulate, metallic, ionic inorganic, ionic organic, but also nonionic organic impurities, and salts or oils present in traces, from corrosive gases, in which the gas is enriched in at least one process step with an absorbent which is readily miscible with the gas and in which the impurities present in the gas are readily soluble, and the gas is subsequently subjected to membrane filtration, in which the purified gas stream flows through the membrane, and the absorbent enriched with impurities is taken off continuously.

This purification process according to the invention has the following process steps per se:

a) a chemical in the liquid state is converted into the gaseous state in an evaporator,
b) the resultant gas phase is freed from coarse particulate impurities and impurities which are partially in the form of an aerosol by means of a prefilter, the latter impurities being fed to a collecting tank (7),
c) by setting the pressure to a value in the range between 2 and 8 bar, preferably 3 and 8 bar, and simultaneously reducing the temperature to a value in the range from 20 to 50° C., further organic impurities present in the gas stream are deposited,
d) the gas stream pre-purified in this way is passed through at least two ultrafine filters with decreasing pore size which are connected in series, with ultrafine particles present in the gas phase being removed by means of a membrane,
e) organic impurities still present are separated off with the aid of an organics separator and fed into a collecting tank (7),
f) an absorbent which is readily miscible with the gas to be purified and has a surface tension of >50 dynes is fed to the gas stream via a saturation tank,
g) the gas stream is subjected to membrane filtration, in which absorbent is removed, and is subsequently fed in a mixer into a constantly circulating solution whose concentration is monitored and regulated by means of acoustic velocity measurement.

The process is carried out in accordance with the invention by employing a chemical selected from the group consisting of ammonia, hydrogen fluoride and hydrochloric acid in the liquid state.

The process is carried out by setting the pressure and the saturation of the gas with absorbent with the aid of a pressure reducer and a heat exchanger.

In the organics separator, low-boiling and high-boiling organic impurities are separated from the resultant multiphase mixture by setting the pressure and temperature in such a way that the low-boiling impurities are in the form of a gas or vapour mixture and the high-boiling impurities are in the form of a condensed oil or aerosol, which are subsequently separated off by means of suitable membranes.

In accordance with the invention, a further pressure reducer for setting the pressure to a value in the range from 1 to 6 bar is installed downstream of the organics separator.

The present invention thus relates to a corresponding process in which, in order to remove ultrafine particulate, metallic, ionic inorganic, ionic organic, but also nonionic organic impurities, and salts or oils present in traces, use is made of membranes comprising a hydrophobic support material which corresponds to the process step characterised by g).

In a preferred embodiment of the process, the absorbent used is ultra-high-purity water.

In a particular embodiment of the process, a gas scrubber in the form of a packed column with integrated demister, which serves as buffer volume in the event of a fault, can be installed downstream of the membrane filtration in process step g).

The gas stream can be fed in process step g) into a mixer having a plurality of inlet tubes, in which the solution is circulated and exothermic heat formed on dissolution is dissipated in a loop or one or more heat exchangers.

In order to carry out the process, the concentration of the dissolved purified gas is monitored and regulated by acoustic velocity measurement combined with precise determination of the solution temperature.

In particular, the object of the present invention is achieved by the use of a membrane which has a liquid film for the removal of both dissolved and particulate impurities from corrosive gases.

The purification process according to the invention is carried out continuously in various process steps connected in series, with the process steps being selected in such a way that together they result in optimum removal of not only particulate, metallic, ionic inorganic, ionic organic, but also of nonionic organic impurities, and salts or oils present in traces. The individual process steps are either steps which are known per se to the person skilled in the art or novel purification steps which, in combination with one another, result in purification of corrosive gases which has hitherto not been achieved. The process enables impurities to be removed to such an extent that they are no longer detectable or the concentrations are <10 ppt.

The process according to the invention can be described in simplified terms as a process into which the following separation methods are integrated:

1. Removal of organic impurities in the crude gas using special separators.
2. Seeding of the gas stream by means of a specific absorbent in order to build up a suitable interfacial layer.
3. Removal of volatile acids, anionic impurities, such as, for example, chlorides and nitrates, trace impurities, such as metal ions or low-volatility salts, or other impurities of the gases by means of a liquid film.
4. Removal of contaminated liquids through a hydrophobic membrane after the purification has been carried out.
5. Adjustment of the plant in order to prepare a high-purity sub-ppt solution.
6. Measurement of the concentration by means of a sonic converter in a special tubular probe, with coupled control of the other process parameters (pressure, temperature and flow rates).

The purification according to the invention is carried out per se by converting pressure-liquefied chemicals into the gaseous state in an evaporator (1). In the case of HF, this is carried out at a temperature of >19° C. and at atmospheric pressure. A pre-filter (2) is used to free this crude gas from coarse particulate impurities, which settle on the filter surface. At the same time, some of the aerosols present in the gas are already separated off by the prefilter (2). The aerosols separated off in this way are collected in a collecting tank (7).

In gases or in the pressure-liquefied gases, high-boiling organic impurities, preferably oils and water from the preparation process, are in bulk or aerosol form, whereas low-boiling impurities are in the form of a gas or vapour mixture. Organic impurities of this type are removed using the different vapour-pressure values of individual substances in multicomponent mixtures. To this end, a certain pre-pressure and a certain temperature are set in the gas phase with the aid of a pressure reducer (3) and a heat exchanger (4). It has been found that good separation of organic impurities from the gas phase is achieved if the pressure here is in the range between 3 and 8 bar and the temperature is set to a value in the range from 20 to 50° C.

A first separation of organic impurities is carried out after particulate impurities, which are in the form of pipe deposits or dirt particles, have been separated off in a first stage. The particulate impurities are separated off by passing the gas through at least two ultrafine filters (5) connected in series which have decreasing pore sizes in the direction of the gas flow.

After the gas stream has passed through the ultrafine filters or filter membranes, it enters an organics separator (6). For separation of the impurities present in the form of an aerosol, the gas stream is passed through various types of membranes selected depending on the preparation process for the individual gases. The aerosols are diverted into the individual membranes in such a way that droplets form when the aerosol streams combine. Through selection of suitable membrane materials which have a suitable pore structure, "entrainment" of the droplets is prevented. The retained droplets fall, due to gravity, in the direction of the condensate discharge and are collected in a collecting tank (7).

It has been found that the content of high-boiling impurities, i.e. so-called residual oils, in the gas stream after passing through the organics separator is below the detection limit, i.e. <1 ppb. For example, oils can no longer be detected by the analytical methods customary today in ammonia gas which has been purified by the process according to the invention.

Gaseous oil vapours or organic impurities, in the form of bound volatile acids, and anionic impurities, such as chlorides and nitrates, metal ions present in traces and low-volatility salts, but possibly also ultrafine particulate impurities of various chemical types which are present in extremely small traces, can be removed in a subsequent purification stage. These impurities are removed in a modified membrane filtration process (10). In order to carry out this modified membrane filtration, the pressure of the gas stream is reduced further, preferably to a value in the range from 1 to 6 bar, in an additional pressure reducer (8).

Furthermore, an absorbent is added to the gas stream by being passed through a saturation tank (9). In combination with a defined pressure drop and suitable temperature regulation, a condensed phase (absorbent) is subsequently able to build up on the membrane surface (10) given a suitable choice of membrane. Besides the setting of the pressure and the temperature regulation of the gas stream, the flow direction of the gas plays a particular role here in order to achieve a pressure gradient from top to bottom on the membrane surface. This is of importance for the formation of a uniform liquid film, which in turn has an essential effect on the removal of the impurities.

Under suitable conditions, a saturated liquid film forms as condensed phase on the membrane surface, with the saturation concentration becoming established in accordance with the gas temperature and the differential pressure between the phase interface and the membrane pressure.

This condensed phase on the membrane surface acts in a similar manner to a semipermeable separating membrane in a reverse osmosis plant.

A migratory movement from top to bottom occurs in the liquid film on the membrane surface. As a consequence of the continuous inflow of unpurified gas to which absorbent has been added, the removal of impurities takes place continuously towards the condensate discharge due to droplet formation in the liquid film. If the process is carried out continuously, the inflowing gas passes through the liquid layer on the membrane surface in the equilibrium state, with mass transfer with the, absorbent taking place at the interfacial layer. Moisture or absorbent is in turn removed from the saturated gas on flow through the hydrophobic membrane.

Besides ultrafine particulate impurities of various types, including metallic particles, both inorganic and organic ionic impurities, but also salts or oils present in traces, can be separated off by this modified membrane filtration.

This process step can be carried out using commercially available membrane films. These may consist of different materials and are selected depending on the chemical to be purified. Matched to the corrosive gas to be purified, the impurities present therein and the absorbent employed, a very wide variety of membranes are available to the person skilled in the art for selection. It is possible to use membrane filters with either hydrophilic or with hydrophobic, microporous, thin separating layers. The choice of membrane filter is particularly dependent on the absorbent employed, since effective removal of the impurities still present in the gas can only be carried out if the material of the membrane filter is impermeable to the absorbent in which the impurities are soluble, but the gas to be purified is readily able to pass through the membrane filter. In this case, the absorbent can be removed from the gas stream together with the impurities before the membrane filter.

It has been found that hydrophilic absorbents are particularly suitable for the removal of polar and ionic impurities. A hydrophilic absorbent which is saturated with impurities and gas can be removed particularly well from the gas stream if use is made of membrane filters which consist of hydrophobic material. Suitable membranes are those made from a material selected from the group consisting of polytetrafluoroethylene, perfluoroethylene-propylene and polyethylene which has a suitable pore width and structure. Particularly suitable are corresponding materials having a pore size of less than 3.5 µm, preferably having a pore size in the range from 2.5 to 1 µm. Corresponding membrane filters are commercially available in various designs, and it is consequently readily possible for the person skilled in the art to select a suitable membrane filter depending on the requirements. When selecting a suitable filter, the pore size and pore width are just as important as the molecular and structural construction of the membrane. In combination with the hydrophobic properties of the material, these parameters make a particular contribution to the separating and purifying action.

Hydrophilic absorbents which can be employed are both hydrophilic organic and inorganic solvents. The choice of absorbent is dependent on the impurities present in the gas stream. If the impurities present allow it, use is preferably made of ultra-high-purity water as an inexpensive and easily produced absorbent. However, it is also possible for any other liquid whose surface tension is >50 dynes/cm, which is very readily miscible in any concentration with the gas to be purified and which has an adequate absorption capacity for the impurities present to be used in combination with a hydrophobic membrane filter. Thus, for example, it is also possible to use water-miscible, hydrophilic organic solvents, such as low-molecular-weight alcohols. These may be, for example, i- or n-propanol.

Liquids having a surface tension of less than 50 dynes/cm are unsuitable in combination with a hydrophobic membrane filter. They wet the hydrophobic support material and make it permeable to liquids. The desired separating action of the membrane is lost.

If it is advisable to employ membrane filters having hydrophilic material properties for the desired separating effect, it is readily possible for the person skilled in the art to select a suitable absorbent which does not pass through the membrane filter, but at the same time has adequate solubility for the impurities present in the gas stream and is readily miscible with the gas.

Since absorbents which form a liquid film before the membrane are constantly removed from the continuous process, and unsaturated absorbent is constantly fed freshly to the inflowing unpurified gas stream, constant mass transfer takes place at the phase interface of the liquid film, enabling the above-mentioned impurities to be removed from the gas phase very effectively.

After the gas has passed through the liquid film, it passes through the membrane with release of absorbent. After the-gas has passed through the membrane, organic impurities in the gas pre-purified in this way are no longer detectable or have been removed down to the sub-ppt range and are present in concentrations of <10 ppt.

If the gas throughput through the membrane from top to bottom is considered, it is noted that the throughput drops down to zero as a consequence of liquid accumulation and the associated increase in flow resistance. In this region of the membrane, a "calmed zone" forms, in which the absorbent is fed to the condensate discharge and is discharged from the process.

In order for the process to be carried out in the optimum manner, it is necessary to match the process parameters temperature, gas flow rate, feed of absorbent, gas pressure and pressure difference between the membrane surface and the phase interface to one another, where it should be taken into account that these values are to be matched to the properties of the chemical to be purified. Continuous maintenance of these parameters should also be ensured through suitable measurement and control devices in order to be able to carry out continuous purification of the chemicals in the sub-ppt range.

It has been found that good results can be achieved in an industrial plant if the gas flow rate is set in the range from 100 to 500 kg/h. The temperature and pressure values necessary for the purification can be pre-determined very well using conventional computer programmes and matched to the membrane filtration according to the invention. A suitable absorbent can also be determined from the literature by the person skilled in the art since in general the previous history of the gas to be purified allows conclusions to be drawn on the impurities present.

After the membrane filtration, the gas is fed to a gas scrubber (12), which serves as buffer in the event of a fault. If the membrane filtration process is carried out in the standard way, the gas is not subjected to further purification in the gas scrubber. In particular in the case of membrane fracture, this stage serves to protect the downstream plant parts against contamination with contaminated, unpurified gas.

It has been found that the process according to the invention enables gas purification to a sub-ppt quality which cannot be achieved by purification carried out in the usual manner by means of gas scrubbers.

The downstream gas scrubber is designed as a single-stage column with packing elements and demister. The washing liquid used is a saturated solution prepared from ultra-high-purity water and purified gas. The washing liquid is stored in a separate tank (13) and circulated.

Purification of the gas can be followed either by pressure liquefaction of the gas and transfer into pressure bottles or by the preparation of saturated solutions of the gas.

The latter is carried out in a so-called mixing zone.

This may be designed as a loop reactor, but can also have a different design. The essential feature is that the purified gas is brought into contact with the solvent at a controlled temperature and under controlled pressure conditions with the largest possible surface area of the solvent. This is carried out by feeding the gas to a constantly circulating solution in a special mixer (14) which is matched to the respective solvency of the gas.

It has been found that good results are achieved if the concentration change at the mixing point is about 1–3%. This is achieved by setting a corresponding ratio between the amount of solution circulating and the gas flow rate. The solvent used in this case is usually ultra-high-purity water.

For the preparation of saturated solutions, various designs of mixers are available to the person skilled in the art for selection. A suitable mixer usually has a plurality of inlet tubes which are matched in design terms both in number, shape and length to the particular gas. The gas stream is split over the inlet tubes and introduced into the low-concentration solution circulating constantly at the same pressure and throughput and dissolved at various points in the mixer. The exothermic dissolution process produces heat, which has to be dissipated via one or more heat exchangers. If the mixer is designed as a loop reactor, these heat exchangers can be integrated in a simple manner.

In the process carried out continuously, regular concentration determination is necessary in order to be able to correct any process parameters and eliminate or avoid faults in the process.

It is essential for the purification process according to the invention that the concentration regulation does not take place in the usual manner via the gas flow rate, but instead via the solvent, generally ultra-high-purity water. If the regulation of the concentration setting takes place via the gas flow rate, changes occur in the process parameters, such as pressure and throughput and thus process changes occur at the membranes of the purification stage (10). Regulated concentration setting by measurement and regulation of the pressure and the volume flow rate cannot easily be carried out reliably.

A simple, fast and direct method for determination of the concentration is based on acoustic velocity measurements in the solution and on-line evaluation thereof.

The acoustic velocity is dependent on the density and the adiabatic compressibility of the solution. Maintenance of the required concentration deviation of <0.5% in the solution requires both accurate determination of the solution temperature and an accurate tubular probe, which is necessary for back-coupling of the acoustic velocity.

This problem is solved in accordance with the invention by carrying out the requisite temperature measurement not in the tubular probe itself, but instead in a calming zone. The calming zone is designed as a pipe with a plastic which is a 'poor' heat dissipator. The fact that the saturation behaviour of plastics in solutions with high vapour pressures varies during changes in pressure and temperature results in differentiated measurement behaviour in the acoustic back-coupling of the tubular probe. This behaviour of plastics is taken into account by always carrying out the process in the loop under identical process conditions.

In order to counter the inertia of the regulation system on start-up of the plant, a buffer tank (15) is installed in the loop reactor. Since the solution present in the loop is always subject to the same process conditions, the concentration regulation can adapt itself via the solution already set without the concentration variations that are otherwise usual on start-up of the plant occurring in the system. The buffer tank results overall in better control behaviour and evens out small variations in the solvent feed.

The solution is discharged continuously into the storage tanks (17) via fixed amount regulation.

For the production of the individual components of the plant, materials should be selected which are inert to corrosive attack by the gas stream to be purified, but also meet the purity requirements in the individual stages. High-quality stainless steels, plastics, such as PTFE, PVDF, PFA and PE, can be employed. In particular after the first purification stages in the pure region, the plant is made of high-quality plastics.

BRIEF DESCRIPTION OF THE DRAWINGS

For better understanding and in order to illustrate the invention, a flow chart of a possible arrangement of a plant which falls within the scope of protection of the present invention is attached by way of example. However, owing to the general validity of the inventive principle described, this is not suitable for reducing the scope of protection of the present application just to this example, since it is readily possible for the person skilled in the art to carry out variations in the construction of the plant, depending on the gas to be purified, and to replace individual parts of the plant with devices having the same action.

In the flow chart, the construction of a plant according to the invention is shown by way of example. This plant has the following components:

(1) Evaporator
(2) Pre-filter
(3) Pressure regulation
(4) Heat exchanger
(5) Ultrafine filter
(6) Organics separator
(7) Collecting tank
(8) Additional pressure reducer
(9) Saturation tank
(10) Membrane filtration
(11) Condensate tank
(12) Gas scrubber
(13) Tank
(14) Mixer
(15) Buffer tank
(16) Heat exchanger
(17) Storage tank

TABLE 1

Product quality of a 28% aqueous ammonia solution prepared in accordance with the invention

| | Crude product $NH_3$ 100% [ppb] | Purified $NH_4OH$ 28% [ppb] |
|---|---|---|
| Al | 3.8 | <0.01 |
| As | <1 | <0.01 |
| Au | <1 | <0.01 |
| B | 2.3 | <0.01 |
| Ba | <1 | <0.01 |
| Be | <1 | <0.01 |
| Bi | <1 | <0.01 |
| Ca | 7.4 | <0.01 |
| Cd | <1 | <0.01 |
| Co | 1.0 | <0.01 |
| Cr | 1.0 | <0.01 |
| Cu | 1.5 | <0.01 |
| Fe | 16.0 | <0.01 |
| Ga | <1 | <0.01 |
| Ge | <1 | <0.01 |
| In | <1 | <0.01 |
| K | 4.6 | <0.01 |
| Li | <1 | <0.01 |
| Mg | 2.1 | <0.01 |
| Mn | 1.0 | <0.01 |
| Mo | <1 | <0.01 |
| Na | 5.7 | <0.01 |
| Ni | 1.0 | <0.01 |
| Pb | <1 | <0.01 |
| Pd | <1 | <0.01 |
| Pt | <1 | <0.01 |
| Sb | <1 | <0.01 |
| Sn | <1 | <0.01 |
| Sr | <1 | <0.01 |
| Ti | <1 | <0.01 |
| Tl | <1 | <0.01 |
| V | <1 | <0.01 |
| Zn | 2.3 | <0.01 |
| Zr | | |
| TOC | >10.000 | <501 |

TABLE 2

Composition of filter residues and impurities present in the condensate which has been discharged at the membrane filter

| | Collecting tank of the separator [ppb] | Filter [ppb] |
|---|---|---|
| Al | 30 | 230 |
| As | | |
| Au | <1 | <1 |
| B | 14 | 1250 |
| Ba | 4 | <1 |
| Be | <1 | <1 |
| Bi | <1 | <1 |
| Ca | 560 | 85 |
| Cd | 4 | 270 |
| Co | 1 | 9 |
| Cr | 19 | 140 |
| Cu | 180 | 7860 |
| Fe | 75 | 240 |
| Ga | <1 | <1 |
| Ge | <1 | <1 |
| In | <1 | <1 |
| K | 170 | 1950 |
| Li | <1 | 28 |
| Mg | 220 | 75 |
| Mn | 27 | 1000 |
| Mo | 39 | 440 |
| Na | 760 | 3270 |
| Ni | 240 | 900 |
| Pb | 1 | 1 |
| Pd | | |
| Pt | <1 | <1 |
| Sb | | |
| Sn | <1 | <1 |
| Sr | 2 | <1 |
| Ti | <1 | <1 |
| Tl | <1 | <1 |
| V | <1 | <1 |
| Zn | 380 | 8780 |
| Zr | <1 | <1 |
| TOC | 7000 | 218000 |

The invention claimed is:

1. A continuous process for the removal of particulate, metallic, ionic inorganic, ionic organic, and nonionic organic impurities, and traces of salts or oils, from a corrosive gas, comprising enriching the gas in at least one process step with an absorbent readily miscible with the gas and in which the impurities present in the gas are readily soluble, and subsequently subjecting the absorbent-enriched gas to membrane filtration, wherein the purified gas stream flows through the membrane, and the absorbent with solubilized impurities is taken off continuously.

2. A continuous process for the removal of particulate, metallic, ionic inorganic, ionic organic, nonionic organic impurities, and traces of salts or oils from corrosive gases, comprising:
   a) converting a chemical in the liquid state into the gaseous state in an evaporator,
   b) freeing the resultant gas phase from coarse particulate impurities and impurities which are partially in the form of an aerosol by means of a pre-filter, the latter impurities being fed to a collecting tank,
   c) setting the pressure to 2–8 bar, and simultaneously reducing the temperature to 20–50°C., and depositing organic impurities present in the gas stream,
   d) passing the pre-purified gas stream through at least two ultrafine filters with decreasing pore size connected in series, to remove ultrafine particles present in the gas phase,
   e) separating organic impurities still present with an organics separator and feeding resultant organic impurities into a collecting tank,
   f) feeding an absorbent which is readily miscible with the gas to be purified, and in which the impurities present in the gas are readily soluble and which has a surface tension of >50 dynes to the gas stream via a saturation tank, and
   g) filtering the resultant absorbent-containing at least one gas stream with at least one membrane, removing the absorbent with solubilized impurities, and subsequently feeding the resultant gas stream in a mixer with a constantly circulating solution whose concentration is monitored and regulated by an acoustic velocity measurement.

3. A process according to claim 2, wherein the pressure and the saturation of the gas with absorbent are set with the aid of a pressure reducer and a heat exchanger.

4. A process according to claim 2, wherein in an organics separator, low-boiling and high-boiling organic impurities are separated from the multiphase mixture by setting the pressure and temperature so the low-boiling impurities are in the form of a gas or vapor mixture and the high-boiling impurities are in the form of a condensed oil or aerosol, and are subsequently separated off by membranes.

5. A process according to claim 2, further comprising setting the pressure to 1–6 bar downstream of the organics separator.

6. A process according to claim 2, wherein in step (g) the at least one membrane is a membrane comprising a hydrophobic support material for removing ultrafine particulate, metallic, ionic inorganic, ionic organic, and nonionic organic impurities, and traces of salts or oils.

7. A process according to claim 1, wherein the absorbent used is ultra-high-purity water.

8. A process according to claim 2, further comprising providing a gas scrubber in the form of a packed column with integrated demister, which serves as buffer volume in the event of a fault downstream of the membrane filtration in process step g).

9. A process according to claim 2, wherein the gas stream in process step g) is fed into a mixer having a plurality of inlet tubes, wherein the solution is circulated and exothermic heat formed on dissolution is dissipated in a loop or one or more heat exchangers.

10. A process according to claim 2, wherein the concentration of the dissolved purified gas is monitored and regulated by acoustic velocity measurement combined with precise determination of the solution temperature.

11. A continuous process for the removal of particulate, metallic, ionic inorganic, ionic organic, nonionic organic impurities, and traces of salts or oils, from corrosive gases, comprising:
   a) converting a chemical in the liquid state of ammonia, hydrogen fluoride or hydrochloric acid into the gaseous state in an evaporator,
   b) freeing the resultant gas phase from coarse particulate impurities and impurities which are partially in the form of an aerosol with a prefilter, the latter impurities being fed to a collecting tank,
   c) setting the pressure to 2–8 bar, simultaneously reducing the temperature to 20–50°C., and depositing organic impurities present in the gas stream,
   d) passing the resultant pre-purified gas stream through at least two ultrafine filters with decreasing pore size connected in series, to remove ultrafine particles present in the gas phase,
   e) separating organic impurities still present with an organics separator and feeding resultant organic impurities into a collecting tank,
   f) feeding an absorbent which is readily miscible with a gas to be purified and has a surface tension of >50 dynes to the gas stream via a saturation tank, and
   g) filtering the absorbent-containing gas stream with at least one membrane, removing the absorbent, and subsequently feeding the resultant gas stream in a mixer with a constantly circulating solution whose concentration is monitored and regulated by an acoustic velocity measurement.

12. A process according to claim 1, wherein the membrane comprises polytetrafluoroethylene, perfluoroethylene-propylene, or polyethylene.

13. A process according to claim 1, wherein the membrane has a pore size less than 3.5 μms.

14. A process according to claim 1, wherein the absorbent is a hydrophilic organic or inorganic solvent.

15. A process according to claim 1, wherein the absorbent has a surface tension of >50 dynes/cm.

16. A process according to claim 12, wherein the absorbent is ultra-high-purity water.

17. A process according to claim 12, wherein the absorbent is a water-miscible, hydrophilic organic solvent.

18. A process according to claim 12, wherein the absorbent comprises a low-molecular-weight alcohol.

19. A process according to claim 12, wherein the absorbent comprises isopropanol or normal-propanol.

20. A process for removing a contaminant from a gas, comprising filtering the gas enriched with an absorbent through a membrane filter, wherein the contaminant in the gas is soluble in the absorbent and the absorbent becomes enriched with the contaminant, wherein the gas flows through the membrane filter so as to obtain a purified gas and the absorbent enriched with contaminant is continuously removed.

21. A process according to claim 1, wherein a liquid film of the absorbent forms on the membrane surface and the absorbent with solubilized impurities is taken off continuously after falling, by the effect of gravity, down the liquid film.

\* \* \* \* \*